(12) United States Patent
Walker et al.

(10) Patent No.: US 8,712,807 B2
(45) Date of Patent: *Apr. 29, 2014

(54) SYSTEM AND METHOD FOR DETERMINING PAYROLL RELATED INSURANCE PREMIUMS

(71) Applicant: Hartford Fire Insurance Company, Hartford, CT (US)

(72) Inventors: Mervin Walker, Windsor, CT (US); Jesse Pendergrass, Plantsville, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,417

(22) Filed: Dec. 31, 2012

(65) Prior Publication Data

US 2013/0124233 A1    May 16, 2013

Related U.S. Application Data

(63) Continuation of application No. 13/340,261, filed on Dec. 29, 2011, now Pat. No. 8,355,971, which is a continuation of application No. 11/975,224, filed on Oct. 17, 2007, now Pat. No. 8,112,333.

(51) Int. Cl.
*G06Q 40/00* (2012.01)
*G06Q 40/08* (2012.01)

(52) U.S. Cl.
CPC ............... *G06Q 40/08* (2013.01); *G06Q 40/00* (2013.01)
USPC ................................................ 705/4; 705/35

(58) Field of Classification Search
CPC ............................... G06Q 40/08; G06Q 40/00
USPC .......................................................... 705/4, 36
See application file for complete search history.

(56) References Cited

U.S. PATENT DOCUMENTS

| 5,875,435 A | 2/1999 | Brown |
| 5,909,673 A | 6/1999 | Gregory |
| 6,181,814 B1 | 1/2001 | Carney |
| 6,401,079 B1 | 6/2002 | Kahn et al. |
| 6,411,938 B1 | 6/2002 | Gates et al. |
| 6,829,588 B1 | 12/2004 | Stoutenburg et al. |

(Continued)

OTHER PUBLICATIONS

Barbara Whitaker; "A Less Burdensome Path to Safeguard the Future"; The New York Times (Aug. 3, 1997), 3 pages.

(Continued)

*Primary Examiner* — Kirsten Apple
*Assistant Examiner* — Scott S Trotter
(74) *Attorney, Agent, or Firm* — Howard IP Law Group, PC

(57) ABSTRACT

A computer-implemented method for determining payroll related insurance premiums includes receiving at a server computer first payroll data relating to a first employer in a first data format from a first source and second payroll data in a second data format from a second source. At least one of the first source and the second source includes an employer payroll computer system at an employer location. The received data is read and extracted by a utility program at the employer location. The method further includes conditioning the received payroll data into uniform format payroll data; filtering by at least one of the utility program and the server computer the payroll data to remove non-premium related data; applying by inclusion and exclusion rules from a rules engine to determine payroll data items to consider in calculating a payroll-based insurance premium; and calculating payroll-based insurance premiums.

20 Claims, 10 Drawing Sheets

(56) References Cited

U.S. PATENT DOCUMENTS

| | | |
|---|---|---|
| 6,938,048 B1 | 8/2005 | Jilk et al. |
| 7,050,932 B2 | 5/2006 | Selby et al. |
| 7,110,979 B2 | 9/2006 | Tree |
| 7,143,051 B1 | 11/2006 | Hanby et al. |
| 7,194,426 B1 | 3/2007 | Box |
| 7,213,064 B2 | 5/2007 | Smith et al. |
| 7,229,013 B2 | 6/2007 | Ben-Aissa |
| 7,249,073 B1 | 7/2007 | Lesk |
| 2002/0022982 A1 | 2/2002 | Cooperstone et al. |
| 2002/0069077 A1 | 6/2002 | Brophy et al. |
| 2002/0138306 A1 | 9/2002 | Sabovich |
| 2002/0184148 A1 | 12/2002 | Kahn et al. |
| 2002/0188480 A1 | 12/2002 | Liebeskind et al. |
| 2003/0171956 A1 | 9/2003 | Cox et al. |
| 2003/0182147 A1 | 9/2003 | Mahoney et al. |
| 2003/0187694 A1 | 10/2003 | Rowen |
| 2003/0204421 A1 | 10/2003 | Houle et al. |
| 2003/0225690 A1 | 12/2003 | Eaton |
| 2003/0229522 A1 | 12/2003 | Thompson et al. |
| 2004/0049397 A1 | 3/2004 | Leisure et al. |
| 2004/0049436 A1 | 3/2004 | Brand et al. |
| 2004/0158512 A1 | 8/2004 | Dean et al. |
| 2004/0167853 A1 | 8/2004 | Sharma |
| 2004/0267595 A1 | 12/2004 | Woodings et al. |
| 2005/0228728 A1 | 10/2005 | Stromquist |
| 2006/0020545 A1 | 1/2006 | Lindheimer et al. |
| 2006/0036528 A1 | 2/2006 | Harnsberger |
| 2006/0064313 A1 | 3/2006 | Steinbarth et al. |
| 2006/0100912 A1 | 5/2006 | Kumar et al. |
| 2006/0173775 A1 | 8/2006 | Cullen, III et al. |
| 2006/0212393 A1 | 9/2006 | Brown |
| 2006/0224475 A1 | 10/2006 | Kramer et al. |
| 2006/0247953 A1 | 11/2006 | Pollack et al. |
| 2006/0253306 A1 | 11/2006 | Richardson et al. |
| 2006/0259437 A1 | 11/2006 | Armstrong et al. |
| 2007/0136156 A1 | 6/2007 | Seeley et al. |
| 2007/0185791 A1 | 8/2007 | Chan et al. |
| 2007/0185793 A1 | 8/2007 | George |
| 2007/0185797 A1 | 8/2007 | Robinson |
| 2007/0203756 A1 | 8/2007 | Sears et al. |
| 2008/0162535 A1 | 7/2008 | Bak |

OTHER PUBLICATIONS

Fort Dearborn Life; "Benefits Manager Overview and Billing Methods" (2007).

Gerald M. Groe, PhD et al; "Research Update: Information Technology and HR"; Human Resources Planning; 91:1 (1996), 7 pages.

Al Wright; "Tools for Automating Complex Compensation Programs", Compensation and Benefits Review; Nov./Dec. 2003, 10 pages.

Carrier and Payroll Service Bypass Agents Pay-as-you-go system nets 10,000 clients in a year, SBB. Small Business Banker. New York: Oct 2000. vol. 1, Iss. 9; p. 11.

Jacquelyn Lynn, Pay As You Go, Entrepreneur, Apr. 2001.

Paychex Teams Up With the Hartford to Help Small Businesses Manage Workers' Compensation Costs, Business Editors. Business Wire. New York:Jun 15, 1999., p. 1.

The Hartford Partners with Time+Plus to Reach More Small Businesses, PR Newswire. New York:Mar. 30, 2004. p. 1.

The Hartford; Self Administered Billing Premium Statement (Document prepared for use by customers.) ; at least as early as Oct. 16, 2007, 2 pages.

The Hartford; List Bill Premium Statement (Document prepared for use by customers.); at least as early as Oct. 16, 2007, 4 pages.

The Hartford; Introducing Your Bill from . . . The Hartford (Document prepared for use by customers.); at least as early as Oct. 16, 2007, 6 pages.

The Hartford; List Billing (Document prepared for use by customers.); at least as early as Oct. 16, 2007, 19 pages.

The Hartford; List Billing—Recordkeeping; Table of Contents (Document prepared for use by customers.); at least as early as Oct. 16, 2007, 12 pages.

The Hartford; Self-Administered Billing (Document prepared for use by customers.); at least as early as Oct. 16, 2007, 28 pages.

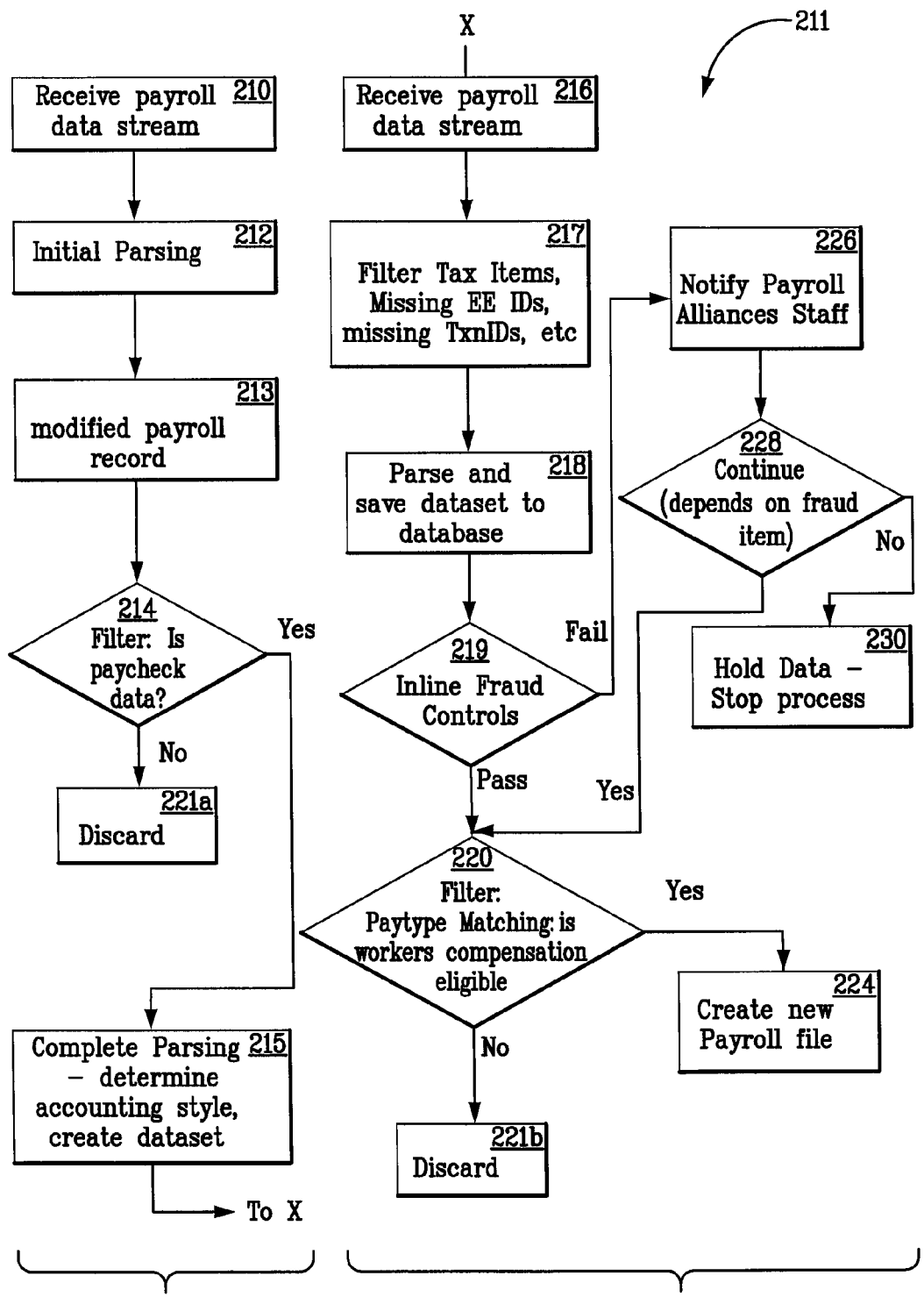

```xml
-<ColDesc colID="1" dataType="STRTYPE">
  <ColTitle titleRow="1" />
  <ColType>Blank</ColType>
</ColDesc>
-<ColDesc colID="2" dataType="STRTYPE">
  <ColTitle titleRow="1" value="SSN/Tax ID" />
  <ColType>SSNOrTaxID</ColType>
</ColDesc>
-<ColDesc colID="3" dataType="STRTYPE">
  <ColTitle titleRow="1" value="Name" />
  <ColType>Name</ColType>
</ColDesc>
-<ColDesc colID="4" dataType="STRTYPE">
  <ColTitle titleRow="1" value="Payroll Item" />
  <ColType>PayrollItem</ColType>
</ColDesc>
-<ColDesc colID="5" dataType="AMTTYPE">
  <ColTitle titleRow="1" value="Amount" />
  <ColType>Amount</ColType>
</ColDesc>
-<ColDesc colID="6" dataType="STRTYPE">
  <ColTitle titleRow="1" value="Account" />
  <ColType>Account</ColType>
</ColDesc>
-<ColDesc colID="7" dataType="DATETYPE">
  <ColTitle titleRow="1" value="Paid Through" />
  <ColType>PaidThroughDate</ColType>
</ColDesc>
-<ColDesc colID="8" dataType="DATETYPE">
  <ColTitle titleRow="1" value="Date" />
  <ColType>Date</ColType>
</ColDesc>
-<ColDesc colID="9" dataType="STRTYPE">
  <ColTitle titleRow="1" value="Type" />
  <ColType>TxnType</ColType>
</ColDesc>
-<ColDesc colID="10" dataType="IDTYPE">
  <ColTitle titleRow="1" />
  <ColType>TxnID</ColType>
</ColDesc>
```

FIG 4A

```
<DataRow rowNumber="1">
  <ColData colID="2" value="444-55-6666" />
  <ColData colID="3" value="Duncan Fisher" />
  <ColData colID="4" value="Regular Pay" />
  <ColData colID="5" value="1380.00" />
  <ColData colID="6" value="Payroll Expenses" />
  <ColData colID="7" value="2007-01-13" />
  <ColData colID="8" value="2007-01-13" />
  <ColData colID="9" value="Paycheck" />
  <ColData colID="10" value="1A2F-1197758384" />
    </DataRow>
-<DataRow rowNumber="2">
  <ColData colID="2" value="444-55-6666" />
  <ColData colID="3" value="Duncan Fisher" />
  <ColData colID="4" value="Overtime Rate" />
  <ColData colID="5" value="0.00" />
  <ColData colID="6" value="Payroll Expenses" />
  <ColData colID="10" value="1A2F-1197758384" />
      •
      •
      •

<DataRow rowNumber="113">
  <ColData colID="3" value="Employment Development Department" />
  <ColData colID="4" value="CA - Disability Employee" />
  <ColData colID="5" value="122.57" />
  <ColData colID="6" value="Payroll Liabilities" />
  <ColData colID="7" value="2007-01-31" />
  <ColData colID="8" value="2007-02-07" />
  <ColData colID="9" value="Liability Check" />
  <ColData colID="10" value="200B-1197737000" />
  </DataRow>
-<DataRow rowNumber="114">
  <ColData colID="3" value="Employment Development Department" />
  <ColData colID="4" value="CA - Employee Training Tax" />
  <ColData colID="5" value="5.17" />
  <ColData colID="6" value="Payroll Liabilities" />
  <ColData colID="10" value="200B-1197737000" />
```

*FIG 4B*

```
<Paycheck>
  <businessID>1</BusinessID>
  <TxnID>1A2F-1197758384</TxnID>
  <FEIN>101111100</FEIN>
  <Company>C:\Documents and Settings\pendergrasj\My Documents\sample_service-based business.qbw</Company>
  <PayrollEndDate>1/13/2007</PayrollEndDate>
  <CheckDate>1/13/2007<CheckDate>
  <EmployeeID>444-55-6666</EmployeeID>
  <Type>
    <Name>Regular Pay</Name>
    <Amount>1380</Amount>
  </Type>
  <Type>
    <Name>Overtime Rate</Name>
    <Amount>0</Amount>
  </Type>
  <Type>
    <Name>Health Insurance</Name>
    <Amount>12.5</Amount>
  </Type>
  <Type>
    <Name>CA - Employee Training Tax</Name>
    <Amount>2.76</Amount>
  </Type>
  <Type>
    <Name>Federal Withholding</Name>
    <Amount>98</Amount>
  </Type>
  <Type>
    <Name>Social Security Company</Name>
    <Amount>171.12</Amount>
  </Type>
  <Type>
    <Name>Social Security Employee</Name>
    <Amount>85.56</Amount>
  </Type>
  <Type>
    <Name>Medicare Company</Name>
    <Amount>40.02</Amount>
  </Type>
  <Type>
    <Name>Medicare Employee</Name>
    <Amount>20.01</Amount>
  </Type>
  <Type>
    <Name>Federal Unemployment</Name>
    <Amount>22.08</Amount>
  </Type>
  <Type>
    <Name>CA - Withholding</Name>
    <Amount>37.62</Amount>
  </Type>
  <Type>
    <Name>CA - Disablity Employee</Name>
    <Amount>16.28</Amount>
  </Type>
  <Type>
    <Name>CA - Unemployment Company</Name>
    <Amount>144.9</Amount>
  </Type>
</Paycheck>
```

FIG. 4C

```xml
<?xml version="1.0"?>
<XactPay>
   <Date>7/31/2006</Date>
   <PartnerNum>999</PartnerNum>
   <PartnerName>QuickBooks</PartnerName>
   <ServiceType>F</ServiceType>
   <PayrollData>
      <Business ID="1">
         <FEIN>001111101</FEIN>
         <Name>Sample Larry's Landscaping</Name>
         <Address1>308 Farmington Avenue</Address1>
         <Address2 />
         <City>Farmington</City>
         <State>ct</State>
         <Zip>06032</Zip>
         <ZipExt />
         <Phone>860-409-8519</Phone>
         <Fax />
         <Email>jesse.pendergrass@thehartford.com</Email>
         <EmployeeCount>3</EmployeeCount>
         <TotalPayroll>0</TotalPayroll>
         <SIC />
         <ShutdownInd>N</ShutdownIND>
         <ShutdownRem />
         <PayrollFreq>26</PayrollFreq>
         <Status>A</Status>
         <StatusDt>7/31/2006 12:00:00 AM</StatusDt>
         <Employee ID="1">
            <FirstName>Duncan</FirstName>
            <LastName>Fisher</LastName>
            <MiddleInit />
            <EmpID>444556666</EmpID>
            <State>CA</State>
            <Dept>Landscaping</Dept>
            <JobDesc>Landscaping</JobDesc>
            <PeriodStartDt>12/1/2007</PeriodStartDt>
            <PeriodEndDt>12/1/2007</PeriodEndDt>
            <CheckDt>12/1/2007</CheckDt>
            <PayrollItem>
               <PayType>WAGE</PayType>
               <Amount>1380.00>/Amount>
            </PayrollItem>
            <PayrollItem>
               <PayType>OVERTIME_PREMIUM</PayType>
               <Amount>0.00</Amount>
            <PayrollItem>
         </Employee>
```

FIG. 5A

```
<FirstName>Duncan</FirstName>
    <LastName>Fisher</LastName>
    <MiddleInit  />
    <EmpID>444556666</EmpID>
    <State>CA</State>
    <Dept>Landscaping</Dept>
    <JobDesc>Landscaping</JobDesc>
    <PeriodStartDt>12/1/2007</PeriodStartDt>
    <PeriodEndDt>12/1/2007<PeriodEndDt>
    <CheckDt>12/1/2007</CheckDt>
    <PayrollItem>
        <PayType>WAGE</PayType>
        <Amount>1380.00</Amount>
    </PayrollItem>
    <PayrollItem>
        <PayType>OVERTIME_PREMIUM</PayType>
        <Amount>0.00</Amount>
    </PayrollItem>
</Employee>
```

*FIG. 5B*

SYSTEM AND METHOD FOR DETERMINING PAYROLL RELATED INSURANCE PREMIUMS

CROSS REFERENCE TO RELATED APPLICATIONS

This application is a continuation application of co-pending U.S. patent application Ser. No. 13/340,261 entitled System and Method for Processing Payroll Related Insurance Premiums, filed Dec. 29, 2011, which is a continuation of U.S. patent application Ser. No. 11/975,224, filed Oct. 17, 2007, now U.S. Pat. No. 8,112,333, the entire contents of each of which are herein incorporated by reference in their entireties for all purposes.

FIELD OF THE INVENTION

This invention relates to a system and method for processing payroll insurance premiums such as workers' compensation payment obligations, and more particularly, to a system and method for dynamically verifying, calculating and billing insurance premiums in real time.

BACKGROUND OF THE INVENTION

In order to determine the appropriate premiums in certain lines of the insurance business such as workers' compensation an insurance company must have an accurate assessment of the insured's total exposure during a fixed period of time. An insured's total workers' compensation premium as it might for certain general liability insurance depends on the types of employees and total payroll of the insured. Previously, the calculation of payment premiums has been performed retrospectively, e.g. for the previous month's premiums due. In other instances, costly and time-consuming audits lead to premium adjustments that reflect the actual number of employees. On occasion, insurance companies make adjustments to premium at policy renewal, expiration or cancellation. Because workforces change over time, workers' compensation premium payments frequently represent over or under charges for the insured. In either case, the difference between the actual amounts owed and that paid creates inefficiencies in cash flow. Payments lower than the required premiums tend to over estimate cash flow. Payments higher than the required premiums tend to under utilize available cash. A method and system that accurately determines the workers' compensation exposure on a daily, weekly or monthly basis would eliminate the under and over payments businesses currently experience.

SUMMARY OF THE INVENTION

The present invention pertains to a computer system comprising a remote site payroll system configured with a accounting/bookkeeping software such as QuickBooks® Assisted Payroll or QuickBooks® Pro/Premier/Enterprise, a customer payroll system having a payroll database; a utility to permit a central site computer server to read payroll accounts residing in a payroll database at the remote site; an Internet connection having a browser; the central site server having a filter to allow extraction of payroll data exclusive of other payroll deductions; and a rules engine customized to a particular remote payroll system that includes a worker classification means to separate different occupations; and a billing system.

The inventive process comprises: validating username/passwords before accessing a customer payroll system payroll database; accessing the customer payroll system payroll database; encrypting payroll data; transmitting encrypted payroll data from the remote site to the central site asynchronously or scheduled in real time; uploading the payroll data onto the central site server database; collecting an employee roster associated with the payroll data; categorizing pay-type information; parsing and translating the categorized information; storing the parsed and translated information into temporary databases; detecting the presence or absence of fraud that may be related to the payroll data; transferring the payroll data resident in the temporary databases to a process for applying state jurisdictional inclusion and exclusion rules applicable to workers' compensation payments; and pushing final data into a billing system for debiting the customer account.

The invention herein is also drawn to a payroll system for determining an insurance premium comprising: an accounting/bookkeeping software where regular payroll data resides; a utility that permits reading payroll accounts residing in the accounting/bookkeeping software; an extraction means to generate a payroll file exclusive of deductions required for determination of the premium; a rules engine that applies jurisdictional inclusion and exclusion rules; a calculator to determine premiums owed; and a mechanism for transferring one or more premium bills to a billing system.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 3A is a flow chart of a method of operation of one embodiment of the invention;

FIG. 3B is a flow chart of a method of operation of one embodiment of the invention;

FIG. 4A is exemplary computer data produced prior to translation parsing and filtering in accordance with one embodiment of the invention;

FIG. 4B is exemplary computer data produced prior to translation parsing and filtering in accordance with one embodiment of the invention;

FIG. 4C is exemplary computer data produced following filtering in accordance with one embodiment of the invention;

FIG. 5A is exemplary computer data produced following filtering, translation and parsing in accordance with one embodiment of the invention;

FIG. 5B is exemplary computer data produced following filtering, translation and parsing in accordance with one embodiment of the invention;

DETAILED DESCRIPTION OF THE INVENTION

Figure 1:
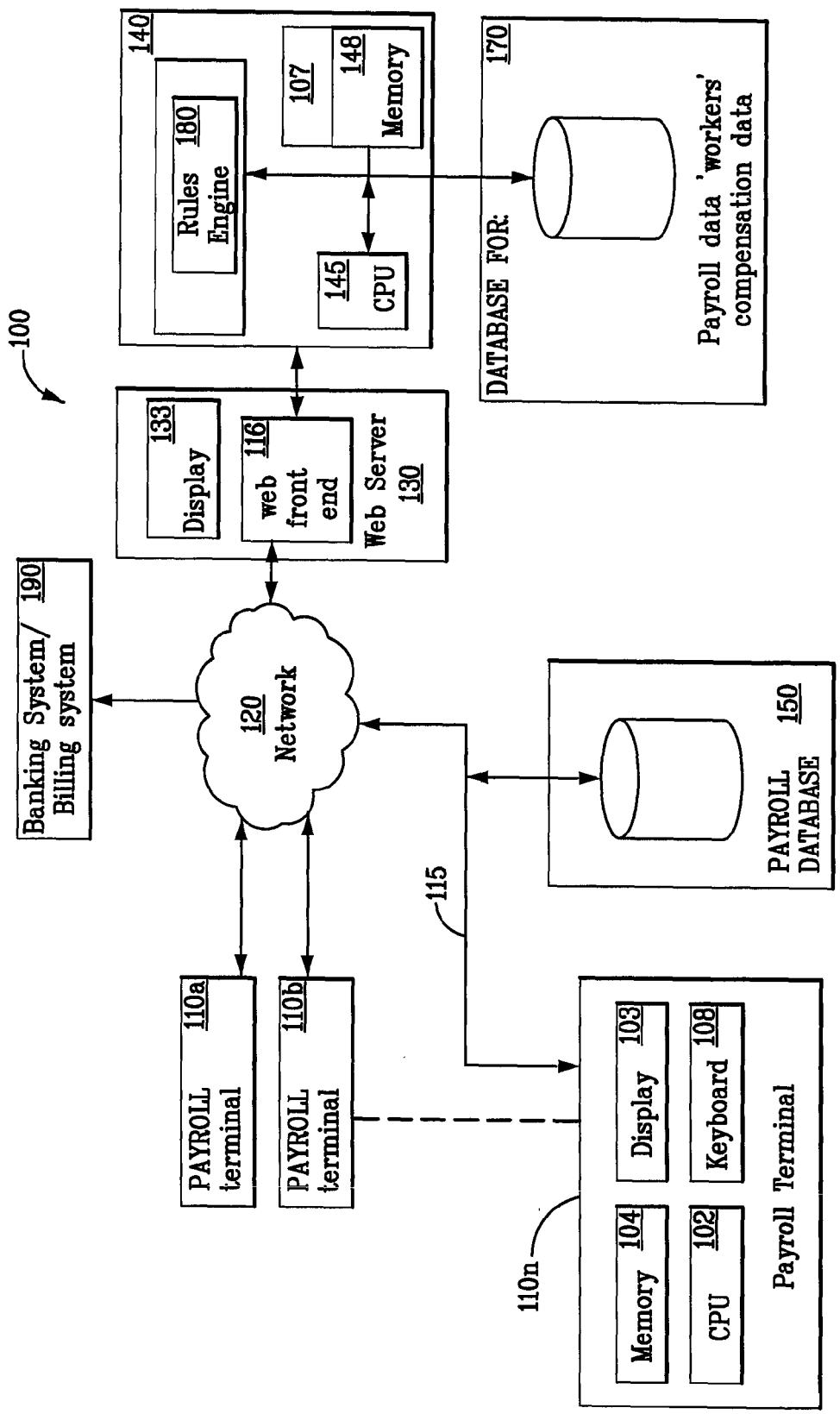
FIG. 1 is a block diagram illustrating a system for accumulating, processing, administering and analyzing workers compensation premiums in an automated workflow environment.

In the figures to be discussed the blocks and arrows represent functions of the process according to embodiments of the present invention which may be implemented as computers, computer executable code, and/or electrical circuits and associated wires or data buses, which transport electrical signals. Alternatively, one or more associated arrows may represent communication (e.g., data flow) between software routines, particularly when the present method or apparatus of the present invention is implemented as a digital process.

In general, system 100 includes a network, such as a local area network (LAN) of terminals or workstations, database file servers, input devices (such as keyboards and document scanners) and output devices configured by software (processor executable code), hardware, firmware, and/or combinations thereof, for accumulating, processing, administering and analyzing workers compensation premiums in an automated workflow environment. The system provides for calculating the workers' compensation premiums for a designated period based on the payroll processes, notifying the insured of the amount of funds and timing of each expected withdrawal from its bank account, withdrawing from the insured's bank account the premium funds and transferring the funds to the insurance carrier. This advantageously results in reduced financial risks, reduced non payments of premiums and improvement of cash flows for the insured. System 100 additionally provides for electronic data transfer pertaining to administrative data, and billing relating to workers compensation premiums.

The features of system 100 may be implemented in a system of computer units communicatively coupled to one another over various types of networks, such as a wide area networks and the global interconnection of computers and computer networks commonly referred to as the Internet. Such a network may typically include one or more microprocessor based computing devices, such as computer (PC) workstations, as well as servers. "Computer", as referred to herein, general refers to a general purpose computing device that includes a processor. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., software, programs or code) from memory and decodes and executes them, calling on the ALU when necessary. "Memory", as used herein, refers to one or more devices capable of storing data, such as in the form of chips, tapes, disks or drives. Memory may take the form of one or more media drives, random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor or a computer.

The term "server," as used herein, generally refers to a computer or device communicatively coupled to a network that manages network resources. For example, a file server is a computer and storage device dedicated to storing files, while a database server is a computer system that processes database queries. A server may refer to a discrete computing device, or may refer to the program that is managing resources rather than an entire computer.

In FIG. 1, other hardware configurations may be used in place of, or in combination with software code to implement an embodiment of the invention. For example, the elements illustrated herein may also be implemented as discrete hardware elements. As would be appreciated, payroll systems 110a, 110b, . . . 110n and server 130, server 140 and the associated databases 150, 170 may be embodied in such means as a general purpose or special purpose computing system, or may be a hardware configuration, such as a dedicated logic circuit, integrated circuit, Programmable Array Logic (PAL), Application Specific Integrated Circuit (ASIC), that provides known outputs in response to known inputs.

FIG. 1 illustrates an exemplary embodiment of the computing system 100 that may be used for implementing an embodiment of the present invention. An entity offering the service of an automated payment of workers' compensation insurance premium on a periodic basis initially requires a total and an adjusted payroll with each payroll run from a user providing the payroll accessible through one or more systems illustrated as payroll systems 110a, 110b, through 110n. The user may be the employer policyholder or a payroll company providing services to an employer. The system 100 calculates the workers' compensation premium for a user based on the payroll processed during the payroll period. System 100 notifies the user of each expected withdrawal from a bank account, access of which is provided by the user. System 100 automatically draws the workers' compensation premium from the user's account based on its actual payroll data for the applicable period. System 100 service allows employer policyholders the ability to pay the insurance premium on a regular basis rather than paying for insurance as in some cases up to a year in advance, which unavoidably impacts cash flow.

System 100 processes payroll insurance premiums, more particularly, where input data related to workers' compensation payment obligations obtained from payroll records is acquired in real-time by validating username/passwords before accessing a customer payroll system payroll database; accessing the customer payroll system payroll database; encrypting payroll data; transmitting encrypted payroll data from the remote site to the central site asynchronously or scheduled in real time; uploading the payroll data onto the central site server database; collecting an employee roster associated with the payroll data; categorizing pay-type information; parsing and translating the categorized information; storing the parsed and translated information into temporary databases; detecting the presence or absence of fraud that may be related to the payroll data; transferring the payroll data resident in the temporary databases to a process for (a) applying state jurisdictional inclusion and exclusion rules applicable to workers' compensation payments; and (b) pushing final data into a billing system for debiting the customer account.

In one embodiment, system 100 for making payroll insurance premiums, more particularly, where input data related to workers' compensation payment obligations obtained from payroll records is acquired in real-time comprises: a remote site payroll system 110n configured with a accounting/bookkeeping software such as QuickBooks® Pro/Premier/Enterprise residing in memory 104, a customer payroll system having a payroll database 150; a utility software resident in memory 104 to permit a central site computer web server 130 to receive from the remote site system 110n payroll data stored in database 150 at the remote site; and server 140 to read payroll accounts either received from the web server 130 or residing in a payroll database 170; an Internet connection 120 having a browser appearing on display 103. The central site includes web server 130 or alternatively a server 140 having conditioning software to parse, filter and generally extract payroll data received from system 110n exclusive of other payroll deductions; and a rules engine 180 customized to a particular remote payroll system includes a worker classification means to separate different occupations. Once the insurance premiums are determined, the premium amount due is transmitted through network 120 to a banking or billing system 190. The billing system 190 debits an employer payables payroll account and credits an insurance company receivable account.

Referring still to FIG. 1, as previously indicated system 100 may include one or more payroll systems 110a, 110b, . . . , 110n. Each payroll system such as system 110n has a processor, such as CPU 102, a display 103, typically supporting a browser, and memory 104. Payroll system 110n includes code operable by the CPU 102 for administering system activities, accumulating payroll information related to workers' compensation premiums, and generating files to be transmitted to web server 130. The payroll systems such as 110a also include code operable to create, administer, and accumulate payroll information. A database 150 is interconnected to the payroll system 110n for storing accumulated payroll information and other data pertinent to a payroll generation system. User input device(s) 108 for receiving input into each terminal of the system 110n are also provided as well as output devices (not shown) such as a printer or electronic document formatter for producing documents being interconnected and responsive to each of the payroll system 110n. System 190 represents a banking system or billing system comprised of an insured's bank wherein a payables debit bank account resides as well as an insurance company bank where in a receivables deposit account resides.

Communications represented by line 115, may be of wired and/or wireless type, to provide interconnectivity between payroll system 110n, database 150 and one or more networks 120, that may in-turn be communicatively coupled to the Internet, a wide area network, a metropolitan area network, a local area network, a terrestrial broadcast system, a cable network, a satellite network, a wireless network, or a telephone network, as well as portions or combinations of these and other types of networks (all herein referred to variously as a network or the Internet). Data is sent to and from the payroll system 110n and the server 130 via a FTP, a HTTP request or http post (collectively referred to herein as an "http post"). The exemplary browser based system 100 can function from any 128 bit (or higher) encryption enabled Internet enabled computer in the world equipped with a browser, such as by way of example and not limitation, MICROSOFT® INTERNET EXPLORER browser for the World Wide Web by Microsoft Corp. of Redmond, Wash.; NETSCAPE NAVIGATOR® by Netscape Communications Corporation, of Mountain View, Calif.; or MOZILLA FIREFOX® by the Mozilla Corporation of Mountain View Calif.

Nevertheless, the invention may also be practiced using other proprietary or non-proprietary network protocols, over other public and/or private computer networks. Further, although preferred embodiments include human-machine interface displays and applets that are capable of running in standard browsers, the invention may be practiced using native human machine interface applications that run directly under the host computers' operating systems (e.g., MICROSOFT® WINDOWS® operating system, UNIX® operating system, Apple™ operating system, LINUX® operating system and the like).

The browser-based system 100 for managing the workers' compensation premium determination system is accessible by a plurality of users such as payroll companies or employers, using participant client computers each equipped with a web-browser. Each participant can enroll in, research, monitor, and select courses of action in the workers' compensation premium determination system at their own pace. As changes related to the premium determination are made they are likewise acknowledged. As such the user becomes aware of the financial consequences of changes and decisions in real-time or near real-time.

In the illustrated embodiment of system 100, central site web server 130 front end 116 communicates with network 120 and payroll system 110n. The functionality of determining the premiums, generating billing, sending notifications, and managing the payment of premiums reside on the server 140, however it will be recognized by those skilled in the art of computer and network programming that it may alternatively reside on web server 130. As will be discussed below, the division of certain functions regarding the preparation of files may reside on system 110n or on one the servers 130, 140 depending on efficiencies determined by those skilled in the art of computer and network programming. Security measures, such as the use of firewalls, encryption and virus protection may be used in connection with network 120 transmissions of information, to protect system 110n and web server 130 from unauthorized access. Such secure networks and methodologies are well known to those skilled in the art of computer and network programming.

In the illustrated embodiment of system 100, server 140 is in communication with database 170 to store workers' compensation payroll information, premium determination, and information related to managing premiums based upon the provisions of an associated insurance policy. The payroll data is initially stored in local database 150. The payroll data resident in the payroll system 110n as it pertains to workers' compensation determination may be pushed from system 110n to the server 130 on a scheduled basis or it may be pulled by server 130 depending on efficiencies determined by those skilled in the art of computer and network programming.

In one embodiment, the server 140 utilizes a rules engine computer code, such as code 107 executable in conjunction with processor 145 and embodied in a computer readable memory 148 in server 140 for ascertaining workers' compensation premiums based upon special jurisdictional requirements such as city, county or state inclusion and exclusion rules and other necessary factors regarding an accurate determination of the workers' compensation insurance premium. The computer code 107 also provides for reading data from at least one database, such as database 170 that stores payroll data associated with a corresponding employer.

In one exemplary embodiment, the web server 130 receives payroll data from payroll system 110n as the data is pushed to the server 130 either asynchronously upon the occurrence of certain events or upon a regular time schedule. Upon receipt of the payroll data by the web server 130, server 130 parses and filters the data placing it in condition for further processing as a modified payroll file by the rules engine 180. The rules engine 180 applies jurisdictional state inclusion and exclusion rules particular to a state and server 140 determines the premium due. The process then communicates the amount due through web server 130 for transmission through network 120 to the banking/billing system 190.

Web server 130, in addition to having code for accepting data from system 110n and database 150, contains code for communicating with the banking/billing system 190, storing notices regarding termination or extension of the associated payroll workers' compensation determination and payment service; code for automatically generating at least one electronic (email, fax, Instant Messaging, etc.) reminder dependently upon the one or more conditions whereby the data received by the central site cannot be appropriately processed due to, for example, damaged files.

Figure 2:
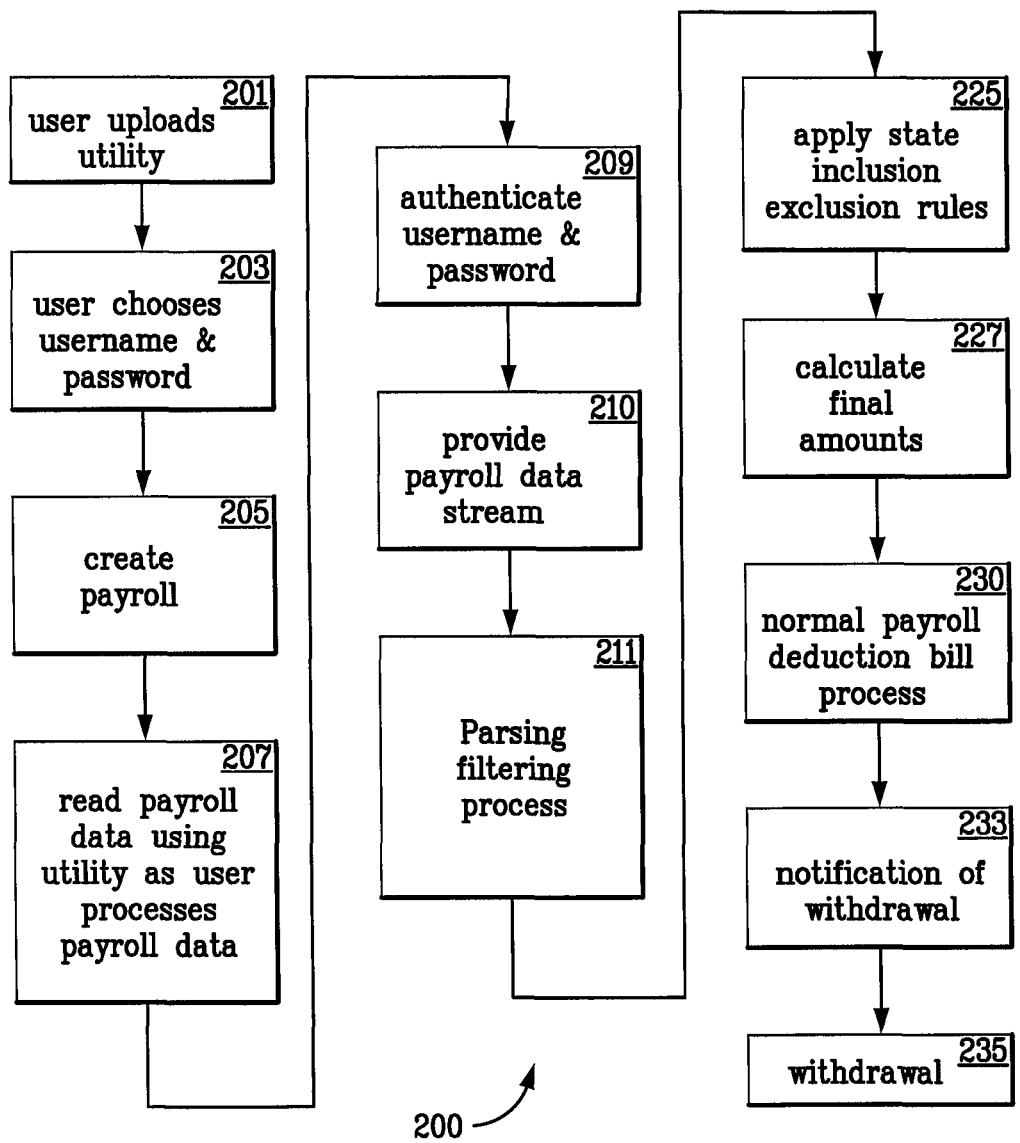
FIG. 2 is a flow chart of a method of operation of one embodiment of the invention.

FIG. 2 illustrates the exemplary operation of a computer-software implemented process 200 for determining the workers' compensation premium associated with a payroll according to an embodiment of the present invention. Process 200 is carried out among an employer company obligated to pay workers' compensation premiums, a payroll company that determines the payroll for the employer company, a service provider that determines the workers' compensation premium, an insurance company to whom the premiums are paid and at least one bank from which funds to pay the premium are withdrawn in favor of the insurance company. It will be recognized that the foregoing parties may be combined in a number of manners, such as the employer company may provide its own payroll, which would eliminate the payroll company from the process. Likewise the workers' compensation determination service provider may be a bank, an insurance company or any other third party service provider.

Referring to FIG. 1 and FIG. 2, the payroll software may by way of example be QuickBooks® Pro/Premier/Enterprise, which in one embodiment of the invention resides in memory 104 and communicates with a payroll database 150. In accordance with an embodiment of the present invention, a user uploads utility program 201, which will allow the web server 130 to access the payroll files. The user is required to install the upload utility 201 typically when the workers' compensation policy is entered into between an insurance company and an employer. The user then chooses a username and password 203 that will be subsequently recognized by the server 130 front end 116 software.

Payroll system 110n determines payrolls on a scheduled basis and communicates the payroll information to either a payroll company or an employer. The payroll company or the employer then processes the payroll and typically pays its employees. Payroll data is uploaded 205 from the employer, i.e., the insured to the payroll system 110, which collects, stores and processes the employee roster, the pay type information, and the individual paychecks. As will be described in greater detail, the workers' compensation insurance premium is then debited against the employer for the benefit of an insurance carrier.

Referring to FIG. 1 and FIG. 2, first block 201 may utilize input device 108 to facilitate uploading the utility into process 200 through system 110 having a display 103, and that connects to database 150 and network 120. Utilizing the input device 108 in a next block 203, the user enters information pertaining to the selection of a username and password. These steps may be performed using a browser (not shown) connected to a website via the Internet.

After the initial set up, that is, after uploading the utility 201 and choosing a username and password 203, the process 200 runs automatically without any intervention by or disruption to the user. When a new payroll is created at system 110n, the utility program reads the payroll data 207 and may store it into payroll database 150 for later transmission to web server 130. After authentication 209, the payroll data is either: uploaded as data stream 210 directly to server 130, in the push configuration, or it is placed it in a ready state making it available for the server 130 in a pull configuration. Process 200 operations typically operate according to a scheduled billing sequence check such as each hour and if new payroll information exists on the payroll system terminal it is uploaded to the server 130 on a periodic basis. When new payroll information is present, the site 130 authenticates the user name and password 209 and provides data stream 210 comprising the payroll data onto the server 130. In one embodiment, the data received by the server 130 front end 116 is in the form of an XML data file as show for purposes of illustration as FIG. 4A, FIG. 4B.

By way of example, QuickBooks® Pro/Premier/Enterprise and other functionally similar payroll systems inefficiently store payroll data in a verbose XML programming language with extra data not generally required for determination of an insurance premium. Therefore, a parsing/filter process 210 extracts from the XML report information essential to a workers' compensation determination.

Process 225 includes applying the jurisdictional conditions such as workers' compensation classification rates to account for various employee status (e.g., a company officer status may have particularities regarding insurance premium requirements) and applies state rules applicable to such status. After the state inclusion and exclusion rules are applied, a calculation 227 of final amounts are made from the data. Following step 227, the data are pushed into a typical payroll deduct banking/billing process 230. At a scheduled time, a notification 233 typically sent via email notifies the employer (i.e., the insured) of an impending premium withdrawal made via electronic funds withdrawal. Following notification the premium funds are withdrawn 235 from the employer's bank account and deposited into the insurance company's account.

Process 200 is capable of recognizing and accommodating a variety of data formats and reforming or conditioning the payroll data dependent upon the source of the data in determining the workers' compensation premium. FIG. 3A and FIG. 3B illustrate the process 211 for efficiently extracting data from the payroll record as illustrated by FIG. 4A and FIG. 4B as required for a determination of workers' compensation premiums and conditioning the payroll data dependent on the source of the data through a parsing and filtering process. By way of example and not limitation data that is not required for a determination of workers' compensation premiums and therefore discarded might be: Payroll Liabilities and Liability (an account to which a payment is attributed). By way of example and not limitation other data that may be filtered are: under TxnType, transactions listed as Liability Checks, Liability Adjustments, Year-to-Date Adjustments, and Non-Payroll Transactions; and under SSNOrTaxID, any employee names having not corresponding identification number or having an unrecognized identification number.

The payroll as shown in XML program data listing FIG. 4A, FIG. 4B indicates a "DataRow" record, having a row of data, as if it were presented in a tabular report. Each field in the "DataRow" is held in a "ColData" element. The columns such as "ColData" are defined at the beginning of the report in FIG. 4A. Each row represents a line item from an employee payroll. Delimiters such as "</Employee>" are located at the end of a record signifying when the payroll record has moved to the next employee, e.g., "Duncan Fisher" in the payroll transaction illustrated by FIG. 4A and FIG. 4B.

The lines of code illustrated in FIG. 4A, describe the column settings, which may be ordered differently by different payroll systems that generate the payroll file. Parsing is a process that translates each of the differing payroll system data streams into a standard data stream that can be processed by the system 200. In Step 210 the process reads the XML data file and passes it to the system 200. At block 212 the payroll data is parsed, that is, translated and data extracted as required for a determination of workers' compensation premiums and saved as a modified payroll record in temporary holding database 213. The initial parsing 212 stores the necessary information in database such as database 170 in a relational database format (business -<employee-<transaction-<payroll item) so that the data can later be further condensed into modified payroll files. A filtering process 214 extracts payroll data exclusive of other payroll deductions, such as Health Insurance, Employee Training Taxes. Information not required is discarded 221a.

Referring to FIG. 4B a first transaction, <ColData colID="10" value="1A2F-1197758384"/> denotes a paycheck paid to employee "Duncan Fisher" and as such passes through the filter 214. The filter 214 also determines whether: (1) the check date is between effective and expiration dates of the policy, (2) the employee is recognized, (3) the employee ID is available, and (4) the record is "Paycheck" type transaction. The results of parsing 212 and filtering 214 produce a paycheck as illustrated in FIG. 4C. Note that the second transaction, ColData colID="10" value="200B-1197737000", has been completely filtered out because it had been designated a tax liability payment and not an employee's earnings.

Still referring to FIG. 3A and FIG. 3B, output from the filtering process 214 is fed to a second parsing process 215 to create a data file in accordance with a preset accounting style. The output file from process 215 outputted as data stream 216 which is fed to a filter 217. This second round of filtering removes some pay types that can be automatically identified as not being Workers' Comp eligible. For example, tax items (which have previously been identified for their business via the WageItemQuery and NonWageItemQuery from Quick-Books) are filtered out. These include social security and federal withholding. A further parsing of the data results in a file that is saved 218 in a database that is accessed by an inline fraud control 219.

The fraud control is any criteria that may evidence tampering with the payroll. In one embodiment of the invention, the process fraud control 219 compares a preloaded employee count against the employee count that was initially underwritten during the generation of the workers' compensation insurance policy. Additionally, the process 219 inspects for any deleted or missing payrolls or payrolls modified after the issuance of the policy.

If the data file created in step 218 fails one or more fraud tests, the process sends a notification that informs an individual who can then perform further analysis or make a determination to continue 228 to process the data file. In the event the so notified individual decides not to continue a determination of workers' compensation premiums, the process 200 is stopped 230. In Step 220, if the pay type (e.g. signifying an director and not an employee of a company) as listed in the input file (See, FIG. 4A), is not eligible for having workers' compensation, the file is discarded 221b, otherwise a new data file 224 is created as illustrated in FIG. 5A and FIG. 5B.

In one embodiment, the processes illustrated in FIG. 3A are incorporated into the system 110n and the processes illustrated in FIG. 3B are incorporated into the server 130 or server 140. These two separate sites are interconnected as described in FIG. 1. In an alternate embodiment, the processes illustrated in FIG. 3A and the processes illustrated in FIG. 3B are incorporated into one site comprising server 130 and server 140. In each instance when data is transmitted over an unsecured network as may be the case in regards to network 120, the data is encrypted as it applies to payroll data.

Returning to FIG. 3B, the new data stream 224 file as illustrated in FIG. 5A and FIG. 5B is processed 225 (FIG. 2) through a rules engine 180 where state inclusion and exclusion rules are applied. State exclusion and inclusion rules deal with whether to factor into the workers' compensation premium such items as: Wages, Salaries, Commissions, Bonuses, Overtime (Premium Portion), Shift Differential, Premium Pay, Holiday, Sick, Vacation, Statutory Insurance, Pension, Piecework, Profit Sharing, Incentive Plan, Tool Allowance, Housing Pay, Meal Allowance (regular time), Meal Allowance (overtime), Gift Equivalents, Section 125 (employee paid), Davis-Bacon wages to employee, Annuity plans, Expense reimbursements, Non business expenses, Expense reimbursements, Qualified business expense, Tips, Severance, Military Pay, Employee discounts, Uniform reimbursement, Sick Pay paid by TPA, Davis-Bacon wages to third-party trust, Employer contributions (group insurance/group pension), Employer contributions (salary reduction), Employer contributions (employee savings plans), Employer contributions (retirement), Employer contributions (cafeteria plans), Employer contributions (stock purchase plans), Employer contributions (deferred compensation), Fringe Benefits and Travel Time.

Figure 6:
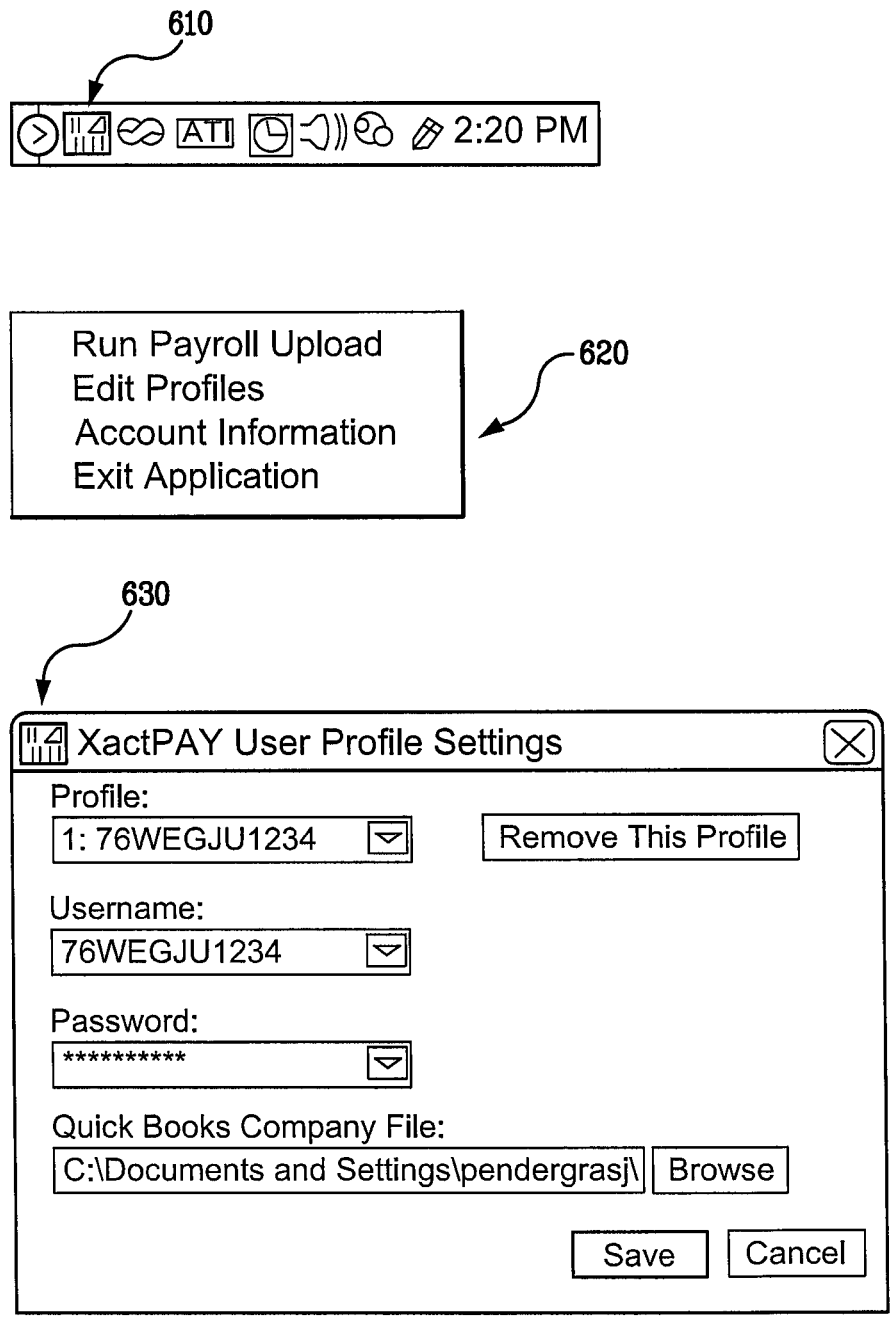
FIG. 6 is an exemplary computer screen in accordance with one embodiment of the invention.
Figure 7:
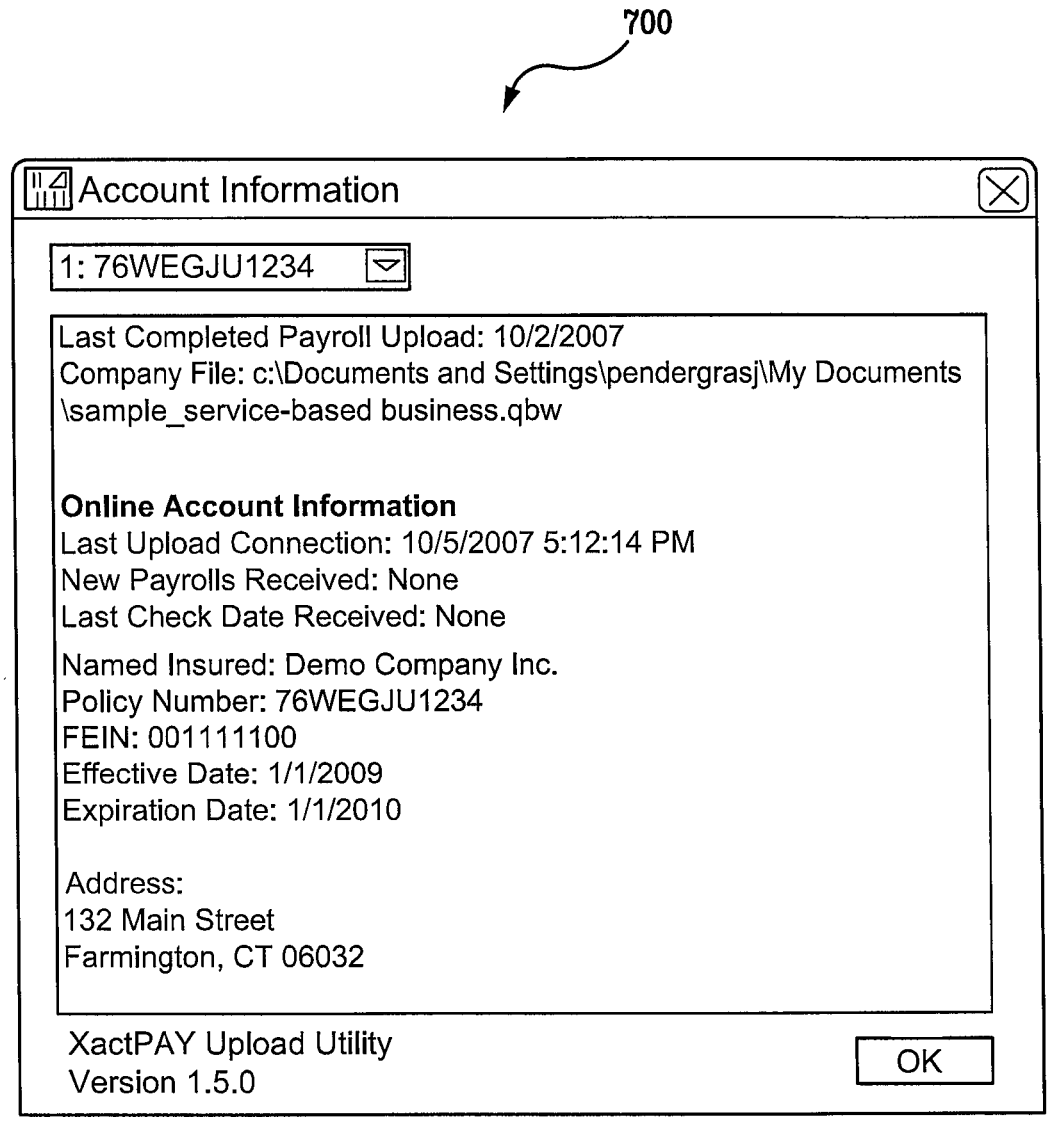
FIG. 7 is an exemplary computer screen in accordance with one embodiment of the invention.

FIG. 6 and FIG. 7 illustrate computer screens appearing in the exemplary browser based system 100 under the control of host computers' operating systems as earlier described to facilitate editing various system parameters. A running notification icon 610 appears in a taskbar of a user screen appearing in a browser resident on FIG. 1 display 103 or optionally on display 133. Clicking the icon 610 causes a notification icon pop-up menu 620 that allows the user to chose one of several operations executed through hyperlinks. The Run Payroll Upload operation begins the process 200 to upload payroll data. The Exit Application hyperlink ends the application process 200. Menu 620 also allows the user to edit profiles. Choosing Edit Profiles, causes the operating system to produce a User Profile Setting screen 630. In the edit profile mode, when the user provides a Username and Password that the system 100 recognizes to allow the user access to the system 100 for purposes of changing parameters in the upload utility illustrated in FIG. 2, steps 201, 203. By way of example, the user can remove a profile by clicking the Remove This Profile or change the profile that indicates the insurance policy by way of a control number (e.g., 76WEGJU1234), under which a workers' compensation liability is insured. The user can also Browse one or more Company Files utilizing a Brower button as illustrated. With reference to FIG. 7 the user can view by way of further example account information 700 for various accounts such as the illustrated account 76WEGJU1234. Account information may include: Last Completed Payroll Upload and date; the Company File name under which the payroll data setting are stored; Online Account Information indicating the Last Upload Connection date and time; status of New Payrolls Received; status of Last Check Date received; Named Insured; Policy Number; the FEIN or Federal Employer Identification Number; the Effective Date of the Policy and the Expiration Date of the policy.

The foregoing invention has been described as a system and method for processing payroll insurance premiums related to workers' compensation, however the invention also pertains to any system and method that depends upon a payroll to determine a liability obligation and concomitant insurance premium. Certain general liability insurance policies have premiums dependent on the number of workers or contractors employed because actuarially these numbers best reflect a general liability risk. Examples of general liability dependent upon number of workers and contractors are construction and farming. In these examples, the number of workers is a measure of activity and thus correlates to general liability risk. Other examples are known to exist and in each instance the present system and method may be employed extract payroll information and dynamically verify, calculate and bill general liability premiums in real time.

While the foregoing invention has been described with reference to the above embodiments, additional modifications and changes can be made without departing from the spirit of the invention. Accordingly, such modifications and changes are considered to be within the scope of the appended claims.

What is claimed is:

1. A computer-implemented method for determining payroll related insurance premiums, comprising:

receiving at a server computer first payroll data relating to a first employer in a first data format from a first source and second payroll data in a second data format from a second source, wherein at least one of the first source and the second source comprises an employer payroll computer system at an employer location, the received data read and extracted by a utility program at the employer location;

conditioning by the server computer the received payroll data in the first and second data formats into uniform format payroll data;

filtering by at least one of the utility program and the server computer the payroll data to remove non-premium related data;

applying by the server computer one or more inclusion and exclusion rules from a rules engine to the uniform format payroll data to determine payroll data items to consider in calculating a payroll-based insurance premium; and calculating by the server computer payroll-based insurance premiums using said data items.

2. The computer-implemented method of claim 1, wherein at least one of the first source and the second source comprises a payroll company.

3. The computer-implemented method of claim 1, wherein the first source comprises a first employer payroll computer system at a first employer location, the first employer payroll computer system comprising a non-transitory computer-readable medium storing accounting software program instructions, and a data storage device having first employer payroll data stored in accordance with a format determined by the accounting software program, and wherein the second source comprises a second employer payroll computer system at a second employer location, the second employer payroll computer system comprising a non-transitory computer-readable medium storing accounting software program instructions, and a data storage device having second employer payroll data stored in accordance with a format determined by the accounting software program.

4. The computer-implemented method of claim 1, wherein the filtering comprises receiving a payroll transaction associated with the first employer, determining whether a check date of the payroll transaction is between an effective date and an expiration date of an insurance policy issued to the first employer, and responsive to determining that the check date is not between the effective date and the expiration date of the insurance policy, filtering out the payroll transaction.

5. The computer-implemented method of claim 1, wherein the filtering comprises receiving a payroll transaction associated with the first employer, determining whether a transaction type field of the payroll transaction has a value of at least one of liability checks and liability adjustments, and responsive to determining that the value of the transaction type field is at least one of liability checks and liability adjustments, filtering out the payroll transaction.

6. The computer-implemented method of claim 1, wherein the first data format is a first XML data format having first column settings and the second data format is a second XML data format having second column settings.

7. The computer-implemented method of claim 1 further comprising transmitting the payroll data by at least one of the employer payroll computer systems to the server computer in real time.

8. The computer-implemented method of claim 1 further comprising the step of transferring one or more premium bills including one or more of the payroll-based insurance premiums to a billing system.

9. A computer system for determining payroll-based insurance premiums, comprising:

a hardware server configured to:

receive first payroll data relating to a first employer in a first data format from a first source and second payroll data in a second data format from a second source, wherein at least one of the first source and the second source comprises an employer payroll computer system at an employer location, the received data read and extracted by a utility program at the employer location;

condition the received payroll data in the first and second data formats into uniform format payroll data;

apply one or more inclusion and exclusion rules from a rules engine to the uniform format payroll data to determine payroll data items to consider in calculating a payroll-based insurance premium; and calculate computer payroll-based insurance premiums using said data items;

wherein at least one of the hardware server and the utility program is configured to filter the payroll data to remove non-premium related data.

10. The system of claim 9, wherein at least one of the first source and the second sources comprises a payroll company.

11. The system of claim 9, wherein the first source comprises a first employer payroll computer system at a first employer location, the first employer payroll computer system comprising a non-transitory computer-readable medium storing accounting software program instructions, and a data storage device having first employer payroll data stored in accordance with a format determined by the accounting software program, and wherein the second source comprises a second employer payroll computer system at a second employer location, the second employer payroll computer system comprising a non-transitory computer-readable medium storing accounting software program instructions, and a data storage device having second employer payroll data stored in accordance with a format determined by the accounting software program.

12. The system of claim 9, wherein the filtering of the payroll data comprises receiving a payroll transaction associated with the first employer, determining whether a check date of the payroll transaction is between an effective date and an expiration date of an insurance policy issued to the first employer, and responsive to determining that the check date is not between the effective date and the expiration date of the insurance policy, filtering out the payroll transaction.

13. The system of claim 9, wherein the filtering comprises receiving a payroll transaction associated with the first employer, determining whether a transaction type field of the payroll transaction has a value of at least one of liability checks and liability adjustments, and responsive to determining that the value of the transaction type field is at least one of liability checks and liability adjustments, filtering out the payroll transaction.

14. The system of claim 9, wherein the first data format is a first XML data format having first column settings and the second data format is a second XML data format having second column settings.

15. The system of claim 9, wherein the hardware server is further configured to transmit the payroll data by at least one of the employer payroll computer systems to the server computer in real time.

16. The system of claim 9, wherein the hardware server is further configured to transfer one or more premium bills including one or more of the payroll-based insurance premiums to a billing system.

17. The system of claim 9, wherein the one or more inclusion and exclusion rules comprise state jurisdictional rules relating to workers compensation insurance.

18. A non-transitory computer readable medium having computer-readable instructions stored thereon which, when executed by a processor, cause the processor to:

receive first payroll data relating to a first employer in a first data format from a first source and second payroll data in a second data format from a second source, wherein at least one of the first source and the second source comprises an employer payroll computer system at an employer location, the received data read and extracted by a utility program at the employer location;

condition the received payroll data in the first and second data formats into uniform format payroll data;

apply one or more inclusion and exclusion rules from a rules engine to the uniform format payroll data to determine payroll data items to consider in calculating a payroll-based insurance premium; and calculate computer payroll-based insurance premiums using said data items;

wherein the instructions further cause the processor to perform one of: receiving the payroll data filtered by a remote utility program to remove non-premium related data, and filtering the payroll data to remove non-premium related data.

19. The non-transitory computer-readable medium of claim 18, wherein the first data format is a first XML data format having first column settings and the second data format is a second XML data format having second column settings.

20. The non-transitory computer-readable medium of claim 18, wherein the instructions further cause the processor to analyze the received payroll data for evidence of fraud by omission of data relating to one or more employees.

* * * * *